United States Patent [19]

Hofmann et al.

[11] 3,984,275

[45] Oct. 5, 1976

[54] ACID TYPE STARCH ADHESIVE COMPOSITION

[75] Inventors: Leroy Charles Hofmann, Saddle River; Alexander Sadle, Morristown, both of N.J.

[73] Assignee: International Paper Company, New York, N.Y.

[22] Filed: Apr. 25, 1974

[21] Appl. No.: 463,972

[52] U.S. Cl. ............................. 156/328; 156/210; 156/331; 156/292; 156/332; 156/310; 156/336; 260/17.3; 260/17.4 ST; 428/182; 428/514; 428/186; 428/533
[51] Int. Cl.² .......................... C09J 3/02; C09J 3/18
[58] Field of Search .......... 156/331, 336, 328, 292, 156/305, 291, 210, 310, 318, 332; 117/156, 161 LN, 165; 161/266, 268, 267; 162/166, 167, 175; 260/17.3, 17.4 ST; 106/216, 210, 213; 428/182, 186, 514, 535, 533, 537

[56] References Cited
UNITED STATES PATENTS

| | | | |
|---|---|---|---|
| 2,996,462 | 8/1961 | Robbins | 156/328 |
| 3,015,572 | 1/1962 | Casey et al. | 156/210 |
| 3,019,120 | 1/1962 | Bauer et al. | 106/213 |
| 3,337,482 | 8/1967 | Watanabe et al. | 260/17.4 ST |
| 3,431,162 | 3/1969 | Morris | 156/210 |
| 3,444,109 | 5/1969 | Golick et al. | 156/328 |
| 3,485,776 | 12/1969 | Bruner et al. | 117/161 C |
| 3,488,724 | 1/1970 | Jonermeyer et al. | 260/17.4 ST |
| 3,536,561 | 10/1970 | Griffiths | 156/310 |
| 3,620,899 | 11/1971 | Kelly et al. | 156/328 |
| 3,690,981 | 9/1972 | Di Frank et al. | 156/336 |

FOREIGN PATENTS OR APPLICATIONS 1,162,231  8/1969  United Kingdom ................ 156/210

OTHER PUBLICATIONS

Du Pont Technical Bulletin "Elvace Acetate/Ethylene Emulsions for Adhesives," Jan. 1973 pp. 1–12.

*Primary Examiner*—William A. Powell
*Assistant Examiner*—J. J. Gallagher
*Attorney, Agent, or Firm*—Ronald A. Schapira

[57] ABSTRACT

An aqueous acidic adhesive composition is described comprising starch, polyvinylacetate, a copolymer of vinylacetate and ethylene and, optionally, a water-resistant thermosetting resin such as urea-formaldehyde or melamine-formaldehyde. The adhesive is particularly useful as a corrugator adhesive in the preparation of corrugated paperboard which requires a high wet bond strength. Because of its excellent "green bond" characteristics, the corrugators can be run at high speeds to produce a product having acceptable wet bond strengths with the important additional advantages that the bond is strong, tough and flexible.

17 Claims, No Drawings

ACID TYPE STARCH ADHESIVE COMPOSITION

BACKGROUND OF THE INVENTION

This invention generally relates to an improved acid type, resin-fortified starch adhesive, and to a method for bonding surfaces together using the adhesive.

One of the major commercial uses of starch adhesives is in the preparation of corrugated paperboard. As is well known, corrugated paperboard comprises a fluted medium and a liner adhesively joined to the tips of the fluted medium on one or both sides thereof. The adhesive is normally applied in the corrugator to either the fluted medium or the liner. In most commercial corrugators, the adhesive is applied to the tips of the fluted medium and a bond is formed when the adhesive coated tips are pressed against the inner surface of the liner with the assistance of heat and considerable pressure to form the corrugated paperboard.

Although the adhesive of the invention is useful as a multi-purpose adhesive, it finds particular utility as a corrugator adhesive and, for purposes of clarity and illustration only, the adhesive is described herein mainly in terms of a corrugator adhesive and the advantages it provides in the corrugating process.

The corrugating process and the use and operation of corrugators to carry out this process are well known in the art and the details thereof need not be repeated herein. U.S. Pat. Nos. 2,102,937 and 2,051,025 issued to J. V. Bauer describe and show a typical corrugator and corrugating process in which a starch adhesive is employed, said patents incorporated herein by reference. See in particular FIG. 1 of each patent and the portions of the patent specifications pertaining thereto.

In a typical corrugating process, the first step involves the formation of a single faced board, i.e., one having a liner joined to only one side of the fluted medium. This is normally carried out in a portion of the corrugator known as the "single facer". The preparation of single faced board and the operation of the single facer are described in detail in the *Handbook of Paperboard and Board*, by Robert R. A. Higham, Chapter 7, pp. 101-120, Business Books Ltd., London (1971), said publication incorporated herein by reference. See in particular FIG. 7.24 on page 120 thereof.

To prepare single faced board, a strip of paper is corrugated or fluted by means of heated fluted rolls. An adhesive is applied to the tips of the flutes on one side only and the tips then joined to a liner under the influence of pressure and heat to form the single faced paperboard.

If a double faced paperboard is desired, a second operation is carried out in which adhesive is applied to the exposed tips of the single faced board and the adhesive coated tips are then pressed against a second liner in the combining section of the corrugator under the influence of pressure and heat to form the double-walled product. The adhesive then cures to form a permanent, tough, strong bond which maintains the unitary structure of the product. The preparation of double faced board is shown and described in the two Bauer patents and also in the more recent U.S. Pat. No. 3,434,901 to Griffiths et al., said patent incorporated herein by reference. See in particular FIG. 1 thereof. Other types of corrugated paperboard such as double wall board can also be prepared in accordance with known procedures.

The selection of the corrugator adhesive is an important consideration in the successful operation of the corrugator. The adhesive finally selected is the result of numerous factors appreciated by those skilled in the art, including the type of bond required in the finished corrugated product. Because of their generally desirable adhesive properties and relatively low cost, starch adhesives are by far the most common corrugator adhesives in commercial use today.

The most common starch corrugator adhesives in commercial use today are on the alkaline side of the pH range. While such adhesives produce generally acceptable bonds, they normally are not very water-resistant. The water-resistance of the bond can be improved by incorporating into the adhesive a water-resistant thermosetting resin such as urea-formaldehyde or resorcinol-formaldehyde. However, the water-resistance though improved is still not usually suitable for applications in which a highly water-resistant bond is required. For example, corrugated board is widely used to package vegetables for shipment which are wet from prior treating with water. An example of this is the "Hydro-Cooling" process which has been developed for corn, celery, etc., and which requires that the vegetable container be dipped in or showered with water for an appreciable length of time. It will be apparent that if the adhesive bonds in the corrugated board are not water-resistant, the board would be unsatisfactory for this application.

It is known in the art that a highly water-resistant bond is obtainable if a water-resistant thermosetting resin such as urea-formaldehyde or melamine-formaldehyde is added to the starch adhesive, and if the resin-fortified starch adhesive is kept on the acid side of the pH range. Although such adhesives provide water-resistant bonds, they raise new problems. For example, acid type starches have a substantially higher gelation temperature than the alkaline starch adhesives. As a result, they take longer to gel and develop their adhesive properties, and therefore provide an adhesive having a poorer "green bond" than the alkaline starch adhesives. By "green bond" is meant the bond which forms immediately when two surfaces are first brought together, i.e., the bond responsible for initially holding the surfaces together. The green bond is in contrast to the more permanent-bond obtained after the starch has had time to gel.

In a corrugator, good green bond adhesion is very important since the green bond must hold the fluted medium and liner together until the adhesive sets to form the permanent bond. This normally requires a certain amount of time which cannot normally be provided in the corrugator itself without slowing down the speed of the corrugator. A good green bond is especially important in the single facer where the adhesive coated tips of the fluted medium and the liner are pressed together for only a very brief time as they pass between the nip of the single facer rolls.

It is known in the art that when acid type starch adhesives are used, the green bond is usually so poor that unless the corrugator speed is reduced to provide longer residence times in the nip of the single facer rolls, the fluted medium and liner tend to separate after they are joined in the single facer. In this case, interruption of corrugator operation results. Reducing corrugator speed is, of course, undesirable.

There are adhesives known in the art which possess excellent green bond or "quick-gripping" characteristics. One such adhesive is polyvinylacetate, a material which has been widely used as a corrugator adhesive in applications where it is desirable to increase corrugator speed. See *Pulp and Paper*, Second Edition, Vol. 3, James P. Casey, Interscience Publishers (1961), pp. 1932–1933. However, because of its relatively high cost compared to the more commonly used adhesives such as starch, it has generally been used only in specialty applications.

It has been proposed to add polyvinylacetate to acid type starch adhesives to improve their green bond characteristics and thereby obtain fasten corrugator speeds despite the acidic nature of the starch adhesive. The addition of the polyvinylacetate to the acidic starch adhesives raised several serious problems. First, it became very difficult to maintain a uniform consistency in the adhesive since the polyvinylacetate tended to settle out. Secondly, although the bonds were water-resistant, they were also quite brittle.

Uniform consistency is an important property of a corrugator adhesive. An adhesive whose composition was not uniform would produce non-uniform bonds which would not be acceptable. It is also very important that the adhesive bond in corrugated paperboard be flexible. If the bond is brittle, the fluted medium of the board has a tendency to separate from its liners upon being flexed or stressed. Since the board is flexed repeatedly as it passes through the corrugator, a brittle bond could not be tolerated. The bond must be sufficiently flexible to allow the corrugated paperboard to be flexed or stressed without damaging it but not excessively flexible to the point that the bond becomes too soft or weak and begins to flow or become non-heat resistant. For these reasons, polyvinylacetate modified acid type starch adhesives have not been widely adopted despite their improved green bonding characteristics.

It is a general object of this invention to provide an adhesive composition in which the problems associated with previous acid type starch adhesives are overcome.

It is a more specific object of the invention to provide a polyvinylacetate modified acid type starch corrugator adhesive having a highly uniform consistency and green bond characteristics which allow fast corrugator speeds, and which also produces bonds of acceptable flexibility characteristics.

These and other objects of the invention will be apparent to those skilled in the art upon a consideration of this entire specification.

SUMMARY OF THE INVENTION

The above objectives are accomplished, in accordance with the invention, by incorporating into a polyvinylacetate modified acid type starch adhesive optionally including a water-resistant thermosetting resin, a copolymer of vinylacetate and ethylene in an amount effective to render the bond non-brittle and impart to it an acceptable degree of flexibility. It has been found that the resulting adhesive is highly uniform in composition and has excellent bond characteristics. The adhesive of this invention thus permits an acid type starch adhesive to be used as a corrugator adhesive without sacrificing corrugator speed while simultaneously producing acceptable bonds of desirable flexibility characteristics.

More particularly, this invention pertains to an aqueous adhesive composition whose pH is on the acid side comprising starch, polyvinylacetate, a copolymer of vinylacetate and ethylene and, optionally, a water-resistant thermosetting resin such as urea-formaldehyde or melamine-formaldehyde.

The invention further relates to a method for adhesively joining two surfaces, such as the surfaces of the fluted medium and liners of corrugated paperboard, by applying the adhesive composition to at least one of the surfaces and bringing the surfaces together to join them.

It has been found by way of example that an acceptable adhesive results when a little as about 1.5 parts by weight of the vinylacetate-ethylene copolymer are present for every part of polyvinylacetate in the adhesive, although more copolymer, normally about 2.3 parts or more, are preferred for every part of polyvinylacetate present.

Illustratively, at least about 0.15 parts by weight of combined polyvinylacetate and vinylacetate-ethylene copolymer per part of starch have been found acceptable although larger amounts of combined polyvinylacetate and copolymer, normally at least about 0.25 parts and higher, are preferred.

In general, the adhesive contains at least enough polyvinylacetate to obtain the desired green bond properties and at least enough vinylacetate-ethylene copolymer to render the bond flexible. The maximum amount of polyvinylacetate and copolymer present in the blend is basically a matter of practical economics. Under normal circumstances, no more polyvinylacetate and copolymer than needed would be used because of their relatively high cost as compared to the starch. The polyvinylacetate and copolymer can be an addition to the starch content normally found in prior art starch adhesives or they can replace a portion of the starch.

The water-resistant thermosetting resin can be omitted from the adhesive composition in the case where one or more of the surfaces to be adhesively joined themselves contain the resin in a still substantailly uncured form. In such cases, the adhesive composition mixes with the uncured thermosetting resin present in the substrate to which it is applied and therefore need not also be incorporated into the adhesive itself. For example, there are instances when the fluted medium, liners, or both, of corrugated paperboard may have been pretreated with a water-resistant thermosetting resin prior to being processed in the corrugator, in order to make the entire board and not just the adhesive bond, water-resistant. The water-resistant resin component is thus supplied by the fluted medium or liner to which the adhesive is applied.

When the thermosetting resin is incorporated in the adhesive, it is present in an amount effective to impart the desired degree of water-resistance to the adhesive bonds. Thus the amount of resin present would illustratively cover the resin contents of prior art resin-fortified starch adhesives, amounts well known to those skilled in the art.

DESCRIPTION OF THE PREFERRED EMBODIMENTS

The adhesive composition of the invention is an acidic aqueous composition in which the solid components are uniformly distributed to provide a uniform consistency. The pH is on the acid side of the pH scale, i.e., below 7, and normally falls within a range of about 3 to 5. The solids content of the adhesive can vary considerably depending upon such factors as the relative proportions of the various ingredients present and the intended application of the adhesive. Illustratively, the solids content of the adhesive is about 20 to 65% by weight, and preferably about 30 to 40% by weight. As pointed out above, the main solids components are starch, polyvinylacetate, vinylacetate-ethylene copolymer and, optionally, a water-resistent thermosetting resin such as ureaformaldehyde or melamine-formaldehyde. Other solids may also be present as discussed below. For example, small amounts of a starch gelling agent such as caustic, and a pH controlling agent such as alum would normally be included in the adhesive.

The starch component can be any of the numerous starches and modified starches heretofore used in starch adhesives including such illustrative materials as corn starch, wheat starch, tapioca, potato starch and pearl starch. Preferred starches are those typically used in corrugator adhesives of both the acid and alkaline type. Pearl cornstarch is one preferred type of starch. The starch content of the adhesive can vary considerably depending upon numerous factors such as the intended application of the adhesive and the type of starch used. Illustratively, the starch forms about 15 to 35% by weight of the total adhesive composition, and preferably about 20 to 30% by weight.

The amounts of the remaining components of the adhesive can be conveniently expressed relative to the amount of starch present. Thus satisfactory results are obtained when the combined amount of polyvinylacetate and vinylacetate-ethylene copolymer present in the adhesive is at least about 0.15 parts by weight per part of starch, and wherein the weight ratio of vinylacetate-ethylene copolymer to polyvinylacetate is about 1.5 to 5.7. Thus the copolymer illustratively forms about 60 to 85% by weight of the combined amount of polyvinylacetate and copolymer present in the adhesive. An illustrative range is about 0.15 to 2 parts of combined polyvinylacetate and vinylacetate-ethylene copolymer per part of starch. Preferably, about 0.25 to 0.27 parts of combined polyvinylacetate and vinylacetate-ethylene copolymer are present per part of starch and the weight ratio of copolymer to polyvinylacetate is about 2.3 to 4. Thus the copolymer preferably forms about 70 to 80% by weight of the combined amount of polyvinylacetate and copolymer present.

Within the overall illustrative range of 0.15 to 2 parts of combined polyvinylacetate and copolymer per part of starch wherein the weight ratio of copolymer to polyvinylacetate is about 1.5 to 5.7, the amount of polyvinylacetate alone is about 0.022 to 0.8 parts by weight per part of starch and the amount of copolymer alone is about 0.09 to 1.7 parts by weight per part of starch.

Within the overall preferred range of 0.25 to 0.75 parts of combined polyvinylacetate and copolymer per part of starch wherein the weight ratio of copolymer to polyvinylacetate is 2.3 to 4, the amount of polyvinylacetate alone is about 0.05 to 0.23 parts by weight per part of starch and the amount of copolymer alone is about 0.17–0.6 parts by weight per part of starch.

When a water-resistant thermosetting resin is included in the adhesive, the amount is dictated by the degree of bond water-resistance required in any given application. Illustratively, about 0.01 to 0.2, and preferably about 0.03 to 0.05 parts by weight of resin solids per part of starch are employed. In general, the amount of resin present in the composition can vary in accordance with the resin contents of conventional resin fortified acid starch adhesives.

Polyvinylacetate suitable for use in the adhesive of this invention is commercially available from many sources. In most cases, the resin is available as a stable high solids (e.g., 50–56% by weight) acidic aqueous dispersion having viscosities on the order of 800 to 4500 centipoises. Illustrative particle sizes of the polyvinylacetate are about 1 to 10, and preferably about 1 to 3, microns. One preferred source of polyvinylacetate is commercially available from DuPont under the designation Elvacet 81–900. Other suitable commercial polyvinylacetate products are commercially available under the trade designations Vinrez 202A (Stein-Hall & Co.), Polyco 117SS (Borden Chemical Co.), Resyn 25–1025 (National Starch Corp.), and Daratak 17–200 (W. R. Grace & Co.). The molecular weight of the polyvinylacetate can vary widely but in general low to medium molecular weight polyvinylacetates are preferred.

The vinylacetate-ethylene copolymer is also normally commercially available as a stable high solids (50–56%) aqueous acidic emulsion having viscosities on the order of about 1200 to 4500 centipoises. Illustrative copolymer particle sizes are about 0.1 to 2, and preferably about 0.2 and 1, microns. One preferred source of the copolymer is commercially available from DuPont under the trade designation Elvace 1873. The molecular weight of the copolymer can vary widely but in general low to medium molecular weight copolymers are preferred.

Any suitable water-resistant thermosetting resin known to the art, particularly those which have been heretofore incorporated in starch adhesives, can be used in the adhesive of this invention. Illustrative resins include the urea-formaldehyde and melamine-formaldehyde resins.

Urea-formaldehyde resins having a formaldehyde to urea mole ratio of about 1.5 to 2.1, and preferably about 1.6 to 1.8, are preferred. As used herein, a melamine-formaldehyde resin also includes urea-melamine-formaldehyde resins, e.g. urea-formaldehyde resins in which a portion of the urea has been replaced by melamine. Preferred melamine-formaldehyde resins include those urea-formaldehyde resins wherein about 4½ to 6½% of the urea has been replaced by melamine, based on amino group equivalence. A large number of such water-resistant thermosetting resins are commercially available, usually as concentrated (e.g., 54–65%) aqueous dispersions of the resin. One suitable urea-formaldehyde resin is available from the Corn Products Co. under the designation Corez 41–101. The preparation of a suitable melamine-formaldehyde resin is described in Example 1 below.

The adhesive compositions are normally prepared in accordance with normal procedures known to those skilled in the art for preparing conventional starch adhesives. Thus a primary mix of gelled carrier starch is prepared by adding a minor portion of the total starch content of the adhesive, e.g., 10 to 25% by weight of the total starch, to hot water at temperatures of about 120°–140° F. A small amount of a starch gelling agent such as caustic (NaOH) is then added to the mixture to cause gelation of the starch in the primary mix. Illustratively, about 0.03 to 0.05 parts by weight of gelling agent, and preferably about 0.035 to 0.4 parts, are used per part of starch present in the primary mix. Additional water is then added to lower the temperature of the primary mix of gelled carrier starch.

A secondary mix is prepared by adding to hot water at temperatures of about 120°–140° F. the rest of the starch and all of the polyvinylacetate and vinylacetate-ethylene copolymer. A small amount of alum or other neutralizing agent is also added at this point for the purpose of neutralizing the caustic present in the primary mix when the primary and secondary mixes are subsequently combined. This assures an acid pH in the final adhesive composition. Enough neutralizing agent is added to produce the desired acid pH in the adhesive composition. Illustratively about 10 to 16 parts by weight, and preferably about 10–12 parts, of neutralizing agent per part of caustic present in the primary mix are added. The secondary mix is then agitated for a brief period of time after which the water-resistant thermosetting resin is optionally added thereto. In the case where the resin is added, the alum can also function as a curing catalyst for the resin and, in general, the neutralizing agent is preferably selected from compounds which are known curing catalysts for the added resin. Thus for urea-formaldehyde and melamine-formaldehyde resins, salts of a strong acid and weak base such as alum, ammonium salts, aluminum salts, zinc salts and various amine salts, particularly the sulfate, chloride and nitrate salts, would be suitable neutralizing agents and catalysts. Alum is a preferred neutralizing agent.

The primary mix is then slowly added to the secondary mix followed by a brief (15–20 minute) agitation of the combined mixes. The temperature of the mix is then raised to about 110°–140° F. and the adhesive composition is then ready for use as a corrugator adhesive.

The adhesive composition thus has at least a portion of its starch content, i.e., that coming from the primary mix, in a gelled condition. The rest remains in a substantially ungelled condition. The Stein-Hall cup viscosities of the adhesives are illustratively about 30–60 seconds, and preferably about 30–40 seconds. Gel temperatures are illustratively about 160°–170° F., and preferably about 164°–166° F. The preferred pH of the adhesive is about 3 to 4. The density is illustratively about 8.5 to 9.5 pounds per gallon, and preferably about 9 pounds per gallon. The solids are uniformly dispersed throughout the adhesive and the flow properties of the adhesive are highly suitable for use in a corrugator.

The adhesive normally contains small amounts of the gelling agent (caustic) from the primary mix and the neutralizing agent (alum) from the secondary mix. Illustratively, the amount of gelling agent present in the adhesive is about 0.001 to 0.01 parts by weight per part of starch and the amount of neutralizing agent present is about 0.01 to 0.16 parts by weight per part of starch. Preferably the adhesive contains about 0.005–0.008 parts by weight gelling agent per part of starch and about 0.06–0.10 parts by weight neutralizing agent per part of starch. In some cases, it may also contain minor amounts of known curing catalysts for the water-resistant thermosetting resin. In such cases, the amount of catalyst usually present is about 1 to 4 parts by weight per 100 parts of resin solids.

The adhesive composition can then be applied to one or more surfaces which are to be bonded together and the surfaces then brought together to adhesively join them. The good green bond properties of the adhesive immediately hold the surfaces together and keep them together until the starch, or starch and thermosetting resin components, can be set, in accordance with conventional procedures, to form a stronger permanent bond.

The adhesive composition of this invention is particularly useful as a corrugator adhesive at any or all stages in the corrugation operation which use an adhesive. It can be applied to the fluted medium, the liners, or both, to adhesively join the individual components of corrugated paperboard to form the composite finished product. Although the adhesive is usually applied to the tips of the fluted medium, techniques are known to those skilled in the art for applying corrugator adhesives to selected portions of the liners.

In some cases, the fluted medium, liners, or both, are treated with a water-resistant thermosetting resin before they are sent to the corrugator. This occurs, for example, when the entire piece of corrugated board must be water-resistant. Typically a stable aqueous dispersion or emulsion of a water-resistant thermosetting resin such as urea-formaldehyde or melamine-formaldehyde is applied to the board components before they are assembled in the corrugator. The dispersion can be sprayed, roll coated or otherwise applied on to the board components. The resin dispersions used in such application illustratively have viscosities ranging from about 10 to 400 centipoises, a resin solids content of about 35–55% and small amounts, e.g., 1–4 parts per 100 parts of resin, of a curing catalyst for the resin. As discussed above, this catalyst is usually the salt of a strong acid and weak base. Typical well-known catalysts include ammonium chloride, ammonium sulfate, ammonium nitrate and various amine salts particularly sulfate, chloride or nitrate salts. The thermosetting resin is applied to the board components at loadings of about 2–4 pounds per 1000 ft.$^2$ As the pre-treated board components enter the corrugator, the resin on them is normally still moistened and in a substantially uncured condition. When such material is processed in the corrugator, the water-resistant thermosetting resin can be omitted from the corrugator adhesive of the invention since this component is supplied by the pre-treated board components. As the resin-free adhesive is applied to the board components in the corrugator, it mixes with the thermosetting resin carried by these components and produces when cured an acceptable water-resistant bond which is tough but flexible.

In the more normal situation, where the board components fed to the corrugator have not been pretreated with a water-resistant thermosetting resin, the resin is incorporated into the adhesive composition to provide the desired water-resistance in the resulting bond. Thus the water-resistant thermosetting resin is an optional component of the adhesive of the invention whose inclusion or omission can depend upon the nature of the board being processed in the corrugator.

The adhesive composition of this invention produces bonds which are highly water-resistant, strong and flexible. For example, wet bond pin adhesions run on corrugated paperboard prepared with the adhesive, using Tappi Test Procedure RC 269, ranged from about 15 to 60 and, in most instances, were on the order of about 30 to 50.

In addition to its use as a corrugator adhesive, the adhesive composition of the invention is of course a general purpose adhesive useful whenever a good green bond and a flexible permanent bond, whether water-resistant or otherwise, is desired.

The following examples are provided to further illustrate the invention.

EXAMPLE 1

A primary mix of gelled carrier starch was prepared by adding 36 pounds of pearl cornstarch to 13.4 gallons of water heated to 120°F. The blend was agitated for 5 minutes and 1.35 pounds of caustic dissolved in 1.5 gallons of water were then added to serve as a gelling agent for the starch in accordance with known procedures for preparing starch adhesives. The primary mix was heated to 180°F. and held at that temperature for five minutes to gel the starch. 12 gallons of water were then added reducing the temperature of the primary mix to about 100°F.

A secondary mix of starch was prepared by adding to 30 gallons of water at a temperature of about 100°F. the following components:

|  | pounds (wet basis) |
|---|---|
| pearl cornstarch | 150 |
| alum | 15.8 |
| Elvace 1873 | 144 |
| Elvacet 81-900 | 42 |

Elvace 1873 is a stable aqueous emulsion of a copolymer of vinylacetate and ethylene having a solids content of about 55 weight %, a pH of 5.5 – 7.0, a particle size range of 0.2 to 1.0 microns, a density of 8.9 pounds per gallon, and a Brookfield viscosity at 25°C. of 1200 – 1700 centipoises. Elvace 1873 is sold commercially by DuPont.

Elvacet 81 – 900 is a viscous, milk white high-solids dispersion of polyvinylacetate in water having a solids content of about 55 weight %, a pH of 4 – 6, a predominant particle size range of 1 – 3 microns, a density of 9.2 pounds per gallon, and a Brookfield viscosity 8.5 – 10 poises. Elvacet 81-900 is sold commercially by DuPont.

The alum was added to control pH in accordance with normal procedures for preparing an acid type resin fortified starch adhesive.

The secondary mixture was agitated for 15 minutes and 14.4 pounds of an aqueous dispersion of melamine-formaldehyde resin of 54% solids content and a viscosity of 15 to 25 centipoises at 25° C. were then added. The dispersion was prepared by blending 100 parts by weight of Allied Chemical Company's UF Concentrate 85 (60 parts formaldehyde, 25 parts urea, 15 parts water) with 92 parts by weight of a 50% aqueous urea solution and 5.8 parts of Allied's RX-70 melamine. The mix was heated to about 130°-150° F. to dissolve the melamine and then immediately cooled to room temperature. The mole ratio of formaldehyde to urea was about 1.6 to 1.8.

The primary mix was slowly added to the secondary mix over a period of about 20 minutes. The blend was agitated for 15 minutes and then heated to about 130° F. The adhesive composition had the following composition and properties:

| starch | 21.2 wt.% |
|---|---|
| polyvinylacetate | 2.64 wt.% |
| vinylacetate-ethylene copolymer | 9.05 wt.% |
| melamine-formaldehyde resin | 0.89 wt.% |

| parts polyvinylacetate and vinylacetate-ethylene copolymer / part starch | 0.55 |
|---|---|
| parts vinylacetate-ethylene copolymer / part polyvinylacetate | 3.44 |
| parts vinylacetate-ethylene copolymer / part starch | 0.43 |
| parts polyvinylacetate / part starch | 0.125 |
| parts melamine-formaldehyde resin / part starch | .042 |

| Stein-Hall cup viscosity | 30 seconds |
|---|---|
| pH | 3.2 |
| solids | 32 wt.% |
| gel temperature | 166°F. |

The adhesive was then used in a corrugator to prepare corrugated paperboard. The adhesive was applied to the tips of the fluted medium using a roll applicator and was used in the preparation of the single faced as well as the double faced board. The corrugator was run at several progressively increasing speeds until separation of the adhesively joined liner and fluted medium was observed. The maximum single facer speed at which the corrugator was successfully run was about 450 feet per minute, a satisfactory corrugator speed indicative of the good green bond characteristics of the adhesive, particularly in the single facer. The adhesive performed satisfactorily producing a corrugated product having a bond of acceptable water resistance plus the desired toughness and flexibility.

EXAMPLE 2

An adhesive composition was prepared in a manner similar to that of Example 1 except that (1) in preparing the primary mix, 1.3 pounds of caustic gelling agent was dissolved in 1.4 gallons of water (2) the secondary mix of starch contained the following components:

|  | pounds (wet basis) |
|---|---|
| pearl cornstarch | 170 |
| alum | 15.8 |
| Elvace 1873 | 144* |
| Elvacet 81-900 | 42* |

*55% solids content and (3) the blend of primary and secondary mix was agitated for 30 minutes. The adhesive had the following composition and properties:

| | | |
|---|---|---|
| starch | 23 wt.% | |
| polyvinylacetate | 2.58 wt.% | |
| vinylacetate-ethylene copolymer | 8.84 wt.% | |
| melamine-formaldehyde resin | 0.87 wt.% | |
| parts polyvinylacetate and vinylacetate-ethylene copolymer / part starch | | 0.5 |
| parts vinylacetate-ethylene copolymer / part polyvinylacetate | | 3.44 |
| parts vinylacetate-ethylene copolymer / part starch | | .38 |
| parts polyvinylacetate / part starch | | .11 |
| parts melamine-formaldehyde resin / part starch | | .038 |
| viscosity | 300 centipoises | |
| pH | 3.4 | |
| solids | 31.7 wt.% | |
| gel temperature | 164°F. | |

The maximum single facer speed at which the corrugator ran successfully was 450 feet per minute, again indicating the good green bond characteristics of the adhesive. The adhesive bond had acceptable water resistance and was tough and flexible.

EXAMPLE 3

A primary mix of gelled carrier starch was prepared by adding 27 pounds of pearl cornstarch to 10 gallons of water heated to a temperature of 120°F. The blend was agitated for 5 minutes and 0.98 pounds of caustic in 1.1 gallons of water were then added to serve as the gelling agent for the starch. The mix was heated to 180°F. and held at that temperature for fifteen minutes to gel the starch. 9 gallons of water were then added, reducing the temperature of the primary mix to about 100°F.

A secondary mix of starch was prepared by adding to 19.5 gallons of water at a temperature of about 100°F. the following components:

| | pounds (wet basis) |
|---|---|
| pearl cornstarch | 127.5 |
| alum | 11.85 |
| Elvace 1873 | 147.8* |
| Elvacet 81-900 | 45.0* |

*55% solids content

The secondary mix was agitated for 15 minutes and 10.8 pounds of an aqueous dispersion of melamine-formaldehyde resin of 54% solids content prepared as in Example 1 were then added.

The primary mixture was slowly added to the secondary mix over a period of 20 minutes. The blend was agitated for 30 minutes and then heated to about 130°F. The adhesive had the following composition and properties:

| | | |
|---|---|---|
| starch | 22 wt.% | |
| polyvinylacetate | 3.5 wt.% | |
| vinylacetate-ethylene copolymer | 11.6 wt.% | |
| urea formaldehyde | 0.83 wt.% | |
| parts polyvinylacetate and vinylacetate-ethylene copolymer / part starch | | 0.68 |
| parts vinylacetate-ethylene copolymer / part polyvinylacetate | | 3.3 |
| parts vinylacetate-ethylene copolymer / part starch | | 0.52 |
| parts polyvinylacetate / part starch | | 0.16 |
| parts melamine-formaldehyde resin / part starch | | 0.038 |
| viscosity | 1700 centipoises | |
| pH | 3.8 | |
| solids | 36.4 wt.% | |
| gel temperature | 165°F. | |

The adhesive was used as in Example 1 to prepare corrugated paperboard. The maximum single facer speed at which the corrugator was successfully run was about 800 feet per minute, a highly satisfactory speed indicating the good green bond characteristics of the adhesive. The adhesive performed satisfactorily producing a corrugated product having an adhesive bond of acceptable water resistance and the desired toughness and flexibility.

EXAMPLE 4

A primary mix of gelled carrier starch was prepared by adding 115 pounds of pearl cornstarch to 43 gallons of water having a temperature of 120°F. The blend was agitated for 5 minutes and 4.3 pounds of caustic soda gelling agent were then added in five gallons of water. The primary mix was heated to 180°F. and held at that temperature for 15 minutes to gel the starch after which 38 gallons of cold water were added, reducing the temperature of the primary mix.

A secondary mix of starch was prepared by adding to 82 gallons of water heated to a temperature of 130°F. the following components:

|  | pounds (wet basis) |
|---|---|
| pearl cornstarch | 575 |
| alum | 51 |
| Elvace 1873 | 462* |
| Elvacet 81-900 | 135* |

*55% solids content

The blend was agitated for 15 minutes and 46 pounds of Corez 41-101, a 60–65 weight % solids dispersion of urea-formaldehyde resin commercially available from Corn Products Co., were added. The primary mix was then slowly added to the secondary mix over a period of 15–20 minutes. The blend was agitated for 15 minutes while its temperature was adjusted to 120° F.

The resulting adhesive had the following composition and properties:

| starch | 24.8 wt.% |
|---|---|
| polyvinylacetate | 2.66 wt.% |
| vinylacetate-ethylene copolymer | 9.12 wt.% |
| urea formaldehyde | 1.03 wt.% |
| parts polyvinylacetate and vinylacetate-ethylene copolymer / part starch | 0.48 |
| parts vinylacetate-ethylene copolymer / part polyvinylacetate | 3.43 |
| parts vinylacetate-ethylene copolymer / part starch | 0.354 |
| parts polyvinylacetate / part starch | 0.108 |
| parts urea-formaldehyde resin / part starch | 0.042 |
| Stein-Hall cup viscosity | 30–40 seconds |
| pH | 3.2–3.5 |
| solids (wet basis) | 34.6 wt.% |
| solids (bone dry basis) | 32.8 wt.% |
| density | 9.16 pounds/gallon |
| gel temperature | 166°F. |

The adhesive was used in a commercial corrugator run under the usual conditions in which it was applied to the tips of the fluted medium. It produced a highly water resistant bond characterized by a desirable degree of toughness and flexibility. An excellent green bond was obtained in the single facing operation as demonstrated by the fact that no reduction in normal corrugator speed was required. Wet bond pin adhesion tests were run on samples of the corrugated product in accordance with TAPPI test procedure RC 269. The wet pin values averaged about 40.

EXAMPLE 5

This example highlights the use of the adhesive composition in the case where the components which are to form the corrugated paperboard have been pre-coated with a water-resistant thermosetting resin such as urea-formaldehyde, in which case the water-resistant resin can be omitted from the adhesive composition.

An adhesive was prepared as in Example 4 except that the addition of the urea-formaldehyde resin was omitted. The the composition and properties of the adhesive were essentially the same as those given in Example 4 except that the adhesive contained no urea-formaldehyde.

The resin was then used as in Example 4 to produce a corrugated paperboard except that the liners of the board had been previously treated with an aqueous dispersion of a urea-formaldehyde resin containing 2 parts by weight of a conventional urea-formaldehyde acid catalyst (ammonium chloride) per 100 parts of resin solids. The solids content of the dispersion was about 55% and it was applied to the inner faces of the liners at a loading of about 3 pounds of resin solids per 1000 ft.$^2$ of liner. The resin was applied to the liner shortly before it was fed to the corrugator so that the resin was still uncured and in a wet condition at the time the adhesive composition was applied to the tips of the fluted medium in the corrugator. As the adhesive coated tips were then pressed against the inner faces of the liners in the corrugator, the adhesive mixed with the uncured urea-formaldehyde on the liners. Upon curing, a satisfactory water-resistant bond was produced of acceptable toughness and flexibility, even though the adhesive itself did not contain the urea-formaldehyde resin. The good green bond properties of the adhesive were demonstrated by the acceptable speeds at which the corrugator was operated.

The examples and other specific and detailed information presented above were by way of illustration only, and were intended for the purpose of providing a full and complete disclosure of the invention; and such alterations and modifications thereof as would be apparent to those skilled in the art are deemed to fall within the scope and spirit of the invention, bearing in mind that the invention is defined only by the following claims.

What is claimed is:

1. A method for adhesively bonding two adjoining surfaces of a fluted medium and a liner of a corrugated paperboard, which comprises: applying an aqueous acidic adhesive to at least one of the surfaces and bringing the surfaces together to bond them, said adhesive having a solids content of about 20 to 65% by weight and including about 15 to 35% by weight starch and further including polyvinylacetate and a copolymer of vinylacetate and ethylene, wherein the weight ratio of copolymer to polyvinylacetate is about 1.5 to 5.7 and the combined amount of copolymer and polyvinylacetate is about 0.15 to 2 parts by weight per part of starch.

2. The method of claim 1 wherein the adhesive composition further includes about 0.01 to 0.2 parts by weight of a water-resistant thermosetting resin per part of starch.

3. The method of claim 2 wherein the thermosetting resin is selected from the group consisting of urea-formaldehyde and melamine-formaldehyde.

4. The method of claim 1 wherein the surface to which the adhesive composition is applied is the fluted medium of corrugated paperboard.

5. The method of claim 1 wherein, to at least one of the two adjoining surfaces of the corrugated paperboard, a substantially uncured water-resistant thermosetting resin and a curing catalyst for said thermosetting resin are applied before the surfaces are brought together to bond them.

6. The method of claim 1 wherein said adhesive has a solids content of about 30 to 40% by weight and includes about 20 to 30% by weight starch and further includes about 0.25 to 0.75 parts of combined polyvinylacetate and copolymer per part of starch, having a weight ratio of copolymer to polyvinylacetate of about 2.3 to 4.

7. The method of claim 2 wherein the adhesive composition contains 0.03 to 0.05 parts by weight of said thermosetting resin adhesive per part by weight of starch.

8. The method of claim 5 wherein said thermosetting resin is applied to the at least one surface of the two adjoining surfaces in an amount of about 2 to 4 pounds per 1000 sq. ft. of the resin treated surface.

9. The method of claim 5 wherein said thermosetting resin is selected from the group consisting of urea-formaldehyde and melamine-formaldehyde.

10. An aqueous acidic adhesive composition having a solids content of about 20 to 65% by weight, a starch content of about 15 to 35% by weight, and a gel temperature of about 160° to 170°F., further including polyvinylacetate and a copolymer of vinylacetate and ethylene wherein the weight ratio of copolymer to polyvinylacetate is about 1.5 to 5.7 and the combined amount of copolymer and polyvinylacetate is about 0.15 to 2 parts by weight per part of starch.

11. The composition of claim 10 further including about 0.01 to 0.2 parts by weight of a water-resistant thermosetting resin per part of starch.

12. The composition of claim 10 wherein the solids content is about 30 to 40%, the starch content is about 20 to 30%, and wherein about 0.25 to 0.75 parts of combined polyvinylacetate and copolymer per part of starch having a weight ratio of copolymer to polyvinylacetate of about 2.3 to 4 are present.

13. The composition of claim 10 further including about 0.01 to 0.2 parts by weight per part of starch of a water-resistant thermosetting resin selected from the group consisting of urea-formaldehyde and melamine-formaldehyde.

14. The composition of claim 10 wherein said composition has a gel temperature of about 164° to 166°F and a pH of about 3 to 4.

15. The composition of claim 11 which contains 0.03 to 0.05 parts by weight of said thermosetting resin per part by weight of starch.

16. The composition of claim 13 wherein said urea-formaldehyde has a formaldehyde to urea ratio of about 1.5 to 2.1.

17. The composition of claim 13 wherein said melamine-formldehyde comprises a urea-formaldehyde resin wherein about 4½ to 6½% of the urea has been replaced by melamine, based on amino group equivalence.

* * * * *